United States Patent
Geile et al.

(10) Patent No.: US 9,853,849 B1
(45) Date of Patent: Dec. 26, 2017

(54) SYSTEMS AND METHODS TO PRODUCE A CYCLICALLY GENERATED, CONTINUOUS PHASE, FREQUENCY SHIFT KEYING WAVEFORM

(71) Applicant: Frontier Analytics, LLC, Batavia, OH (US)

(72) Inventors: Michael Joseph Geile, Batavia, OH (US); David Maldonado Febus, West Chester, OH (US)

(73) Assignee: Frontier Analytics, LLC, Batavia, OH (US)

( * ) Notice: Subject to any disclaimer, the term of this patent is extended or adjusted under 35 U.S.C. 154(b) by 0 days.

(21) Appl. No.: 15/603,506

(22) Filed: May 24, 2017

Related U.S. Application Data (60) Provisional application No. 62/353,499, filed on Jun. 22, 2016.

(51) Int. Cl.
*H04L 25/03* (2006.01)
*H04L 27/26* (2006.01)

(52) U.S. Cl.
CPC ...... *H04L 27/2636* (2013.01); *H04L 27/2607* (2013.01); *H04L 27/2643* (2013.01)

(58) Field of Classification Search
CPC ............ H04B 1/7097; H04L 25/03834; H04L 27/2636; H04L 27/36; H04L 5/0005; H04L 5/023; H04L 5/06
USPC ......... 375/295, 346, 260; 370/203, 208, 295
See application file for complete search history.

(56) References Cited

U.S. PATENT DOCUMENTS

| | | | |
|---|---|---|---|
| 8,934,556 B2 | 1/2015 | Geile | |
| 2014/0307761 A1* | 10/2014 | Geile | H04L 27/36 375/222 |

OTHER PUBLICATIONS

J. Proakis, "Digital Communications", 2nd edition, McGraw Hill, 1989, Section 3.3.2, pp. 172-186.
S. Weinstein, "The History of Orthogonal Frequency-Division Multiplexing", IEEE Communications Magazine, Nov. 2009.
H. Mung, J. Lim, D Goodman, "Single Carrier FDMA for Uplink Wireless Transmission", IEEE Vehicular Technology Magazine, Sep. 2006.
M. Wylie-Green, E. Perrins, T. Svensson, "Introduction to CPM-SC-FDMA: A Novel Multiple-Access, Power-Efficient Transmission Scheme", IEEE Transactions on Communications, vol. 59, No. 7, Jul. 2011.
R. Mulinde, T. Faizur Rahman, C. Sacchi, "Constant Envelope SC-FDMA for Nonlinear Satellite Channels", IEEE Globecom 2013.
S. Thompson, J. Proakis, J. Zeidler, M. Geile, "Constant Envelope OFDM", IEEE Transactions on Communications, vol. 56, No. 8, Aug. 2008.

* cited by examiner

*Primary Examiner* — Leila Malek
(74) *Attorney, Agent, or Firm* — David A. Topmiller, Esq.

(57) ABSTRACT

Systems and methods are disclosed for producing a cyclically generated, continuous-phase, frequency-shift keying (CG-CPFSK) waveform which may be used for wired and/or wireless communication systems. Such waveforms may have a substantially constant modulus and have an underlying cyclic phase structure. Systems and methods are also disclosed for generating a waveform based on a cyclically continuous signal which may be subsequently translated into a radio frequency for transmission.

18 Claims, 11 Drawing Sheets

SYSTEMS AND METHODS TO PRODUCE A CYCLICALLY GENERATED, CONTINUOUS PHASE, FREQUENCY SHIFT KEYING WAVEFORM

CROSS REFERENCE TO RELATED APPLICATION

This application claims the benefit of provisional application Ser. No. 62/353,499, filed Jun. 22, 2016, the disclosure of which is incorporated herein by reference.

TECHNICAL FIELD

The present disclosure generally relates to systems and methods for producing a cyclically generated, continuous-phase, frequency-shift keying (CG-CPFSK) waveform which may be used for wired and/or wireless communication systems. Such waveforms may have a substantially constant modulus and have an underlying cyclic phase structure.

BACKGROUND

As background, many techniques have been developed to encode or modulate information onto a waveform for the purpose of transmitting said information in a communication system. Some of these techniques have been developed in order to improve the transmission of the waveform, such as increasing the power efficiency of the transmission amplifier (which may improve battery life in battery-powered systems) or reducing the cost of the amplifier. Other techniques have been developed in order to improve reception of the waveform, such as reducing the sensitivity of the receiver due to timing error and/or multipath which may be experienced when the waveform is propagated over-the-air. The CG-CPFSK systems and methods described herein are capable of improving both the transmission and reception of the waveform.

A known technique for encoding information onto a waveform is called continuous-phase modulation (CPM), in which a single carrier waveform is created that has a substantially constant modulus or amplitude. CPM generally includes direct phase modulation and continuous-phase frequency-shift keying (CPFSK) modulation. An advantage of this technique is that is works through saturating a power efficient transmission amplifier and is, therefore, capable of achieving relatively efficient power amplification during transmission of the waveform. A primary drawback is that the signal is vulnerable to distortion caused by the transmission channel (e.g., multipath), either suffers in detection efficiency, or requires a complex detector to mitigate the imposed channel distortion.

Another known technique is called orthogonal frequency division multiplexing (OFDM), which establishes modulation symbols in the frequency domain and transforms them (via discrete Fourier transform, or DFT) to a form in the time domain. A single frame contains several frequency-multiplexed symbols simultaneously that are the sum of sinusoids. The frames are cyclic in nature, meaning that the resulting signal out of the inverse DFT represents a waveform that is continuous from one end of the frame to the other. This results in a bandwidth-efficient waveform structure that may be extended in time (called a guard interval) in order to guard against transmission channel transients and to also mitigate the complexity of equalization. A primary disadvantage of OFDM is that the signal has a high level of amplitude variability and requires a linear amplifier with substantial backoff and is, therefore, inefficient.

A known variation of OFDM, called constant envelope OFDM (CE-OFDM), sends the OFDM signal into a phase modulator; the phase of the signal is defined by a real baseband phase function from a constrained OFDM modulator. The resulting waveform is a constant-envelope signal. A primary drawback of this approach is that the resulting signal has poor detection efficiency.

Yet another known technique is called single-carrier frequency division multiple access (SC-FDMA), which uses a small DFT and larger inverse discrete Fourier transform (IDFT) in combination to create a cyclic time-domain waveform that is the superposition of pulses defined inherently by the DFT and subsequent frequency-domain weighting process. Since the result is cyclic, a guard interval may be formed, as with the OFDM technique. Multiple users may be multiplexed onto SC-FDMA either at baseband or via careful alignment in the radio frequency (RF) channel. The amplitude variability of SC-FDMA is generally less than that of OFDM because the SC-FDMA technique basically creates a cyclic, partial response filtered data pulses in the time domain.

Still another known technique for encoding information onto a waveform is called Nyquist cyclic modulation (NCM), which is a variant of SC-FDMA. The NCM technique uses all the channels for one user and supplies a diverse set of partial response filter variants.

Yet another known technique is called continuous-phase modulation, single-carrier frequency division multiple access (CPM-SC-FDMA), which was developed to reduce the dynamic range of the waveform. In this technique, samples of a CPM waveform are fed into a configuration of the SC-FDMA modulator, and the resulting waveform has reduced amplitude variability. However, the resultant waveform is not CPM (i.e., not constant modulus); only the input is CPM.

Lastly, there is a technique called constant envelope, single-carrier frequency division multiple access (CE-SC-FDMA) that applies a SC-FDMA modulator and sends the output into a phase modulator similar to CE-OFDM. As with CE-OFDM, CE-SC-FDMA has poor detection efficiency.

The CG-CPFSK systems and methods disclosed herein overcome the inherent disadvantages in each of the known techniques by scaling the output of a SC-FMDA modulator to establish the appropriate phase area under a cyclic frame of SC-FDMA pulses. This output is then fed into a numerically controlled oscillator (NCO) or similar apparatus which converts the output value into a frequency-modulated waveform. Only the underlying phase function is cyclic; the resulting waveform is not cyclic but has a phase trellis that is reliably terminated. Also, the modulated waveform may have a substantially constant modulus and no discontinuities in one or more embodiments. Such a modulated waveform permits the use of power-efficient, low-cost amplifiers for the transmitter, while reducing signal sensitivity due to timing error and multipath for the receiver. Note that, in the technique disclosed herein, the SC-FDMA modulator is configured to establish a signal with particular properties that affect frequency changes out of the NCO; this substantially differentiates this system from CE-SC-FDMA.

SUMMARY

In one embodiment, a system is disclosed for converting a symbol frame to a normalized cyclic frame, the system comprising a waveform generator having one or more processing elements arranged to: convert the symbol frame having K samples into a frequency-domain vector by performing a discrete Fourier transform (DFT) on the symbol frame, wherein the frequency-domain vector comprises K members; create an extended frequency-domain vector having L members by adding one or more predetermined frequency-domain members to the frequency-domain vector, wherein L is greater than K; weight each of the L members of the extended frequency-domain vector to produce a weighted extended frequency-domain vector such that the weighted extended frequency-domain vector is both bandwidth limited in the frequency domain and the corresponding time-domain representation of the weighted extended frequency-domain vector is cyclically continuous in the time domain; convert the weighted extended frequency-domain vector into a complex-valued cyclic frame by performing an inverse discrete Fourier transform (IDFT) on the weighted extended frequency-domain vector, wherein the complex-value cyclic frame comprises L samples having a complex value; create a real-valued cyclic frame by taking the real part of the complex-valued cyclic frame; and multiply each of the L samples of the real-valued cyclic frame by a scale factor, G, to produce a normalized cyclic frame comprising L samples, and the scale factor, G, is based on a predetermined phase rotation value ascribed to a modulated pulse in the real-valued cyclic frame.

In another embodiment, a system is disclosed for modulating a carrier waveform with a cyclic waveform corresponding to K symbols from a sequence of symbols, the system comprising a waveform generator having one or more processing elements arranged to: create a symbol frame comprising K symbols from the sequence of symbols, wherein K is a positive integer; convert the symbol frame into a frequency-domain vector by performing a discrete Fourier transform (DFT) on the symbol frame, wherein the frequency-domain vector comprises K members; create an extended frequency-domain vector having L members by adding one or more predetermined frequency-domain members to the frequency-domain vector, wherein L is greater than K; weight each of the L members of the extended frequency-domain vector to produce a weighted extended frequency-domain vector such that the weighted extended frequency-domain vector is both bandwidth limited in the frequency domain and the corresponding time-domain representation of the weighted extended frequency-domain vector is cyclically continuous in the time domain; convert the weighted extended frequency-domain vector into a complex-valued cyclic frame by performing an inverse discrete Fourier transform (IDFT) on the weighted extended frequency-domain vector, wherein the complex-valued cyclic frame comprises L samples; create a real-valued cyclic frame by taking the real part of the complex-valued cyclic frame; multiply each of the L samples of the real-valued cyclic frame by a scale factor, G, to produce a normalized cyclic frame comprising L samples, and the scale factor, G, is based on one or more predetermined phase rotation values and the sum of the L samples of the real-valued cyclic frame containing the single reference pulse; and modulate the carrier waveform with the L samples of the normalized cyclic frame by adjusting the frequency of the carrier waveform based on the amplitude of the L samples of the normalized cyclic frame.

In yet another embodiment, a method is disclosed for converting a symbol frame to a normalized cyclic frame, the method comprising: converting the symbol frame having K samples into a frequency-domain vector by performing a discrete Fourier transform (DFT) on the symbol frame, wherein the frequency-domain vector comprises K members; creating an extended frequency-domain vector having L members by adding one or more predetermined frequency-domain members to the frequency-domain vector, wherein L is greater than K; weighting each of the L members of the extended frequency-domain vector to produce a weighted extended frequency-domain vector such that the weighted extended frequency-domain vector is both bandwidth limited in the frequency domain and the corresponding time-domain representation of the weighted extended frequency-domain vector is cyclically continuous in the time domain; converting the weighted extended frequency-domain vector into a complex-valued cyclic frame by performing an inverse discrete Fourier transform (IDFT) on the weighted extended frequency-domain vector, wherein the complex-valued cyclic frame comprises L samples; create a real-valued cyclic frame by taking the real part of the complex-valued cyclic frame; and multiplying each of the L samples of the real-valued cyclic frame by a scale factor, G, to produce a normalized cyclic frame comprising L samples, and the scale factor, G, is based on a predetermined phase rotation value and the sum of the real portion of the L samples of the real-valued cyclic frame containing a single reference pulse.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference characters and in which:

DETAILED DESCRIPTION

The embodiments described herein generally relate to systems and methods for generating cyclically continuous waveforms which may be used to modulate a carrier to generate a continuous-phase, frequency-shift keying waveform. Such modulated waveforms may be used to transmit information via wired or wireless communication systems.

Figure 1:
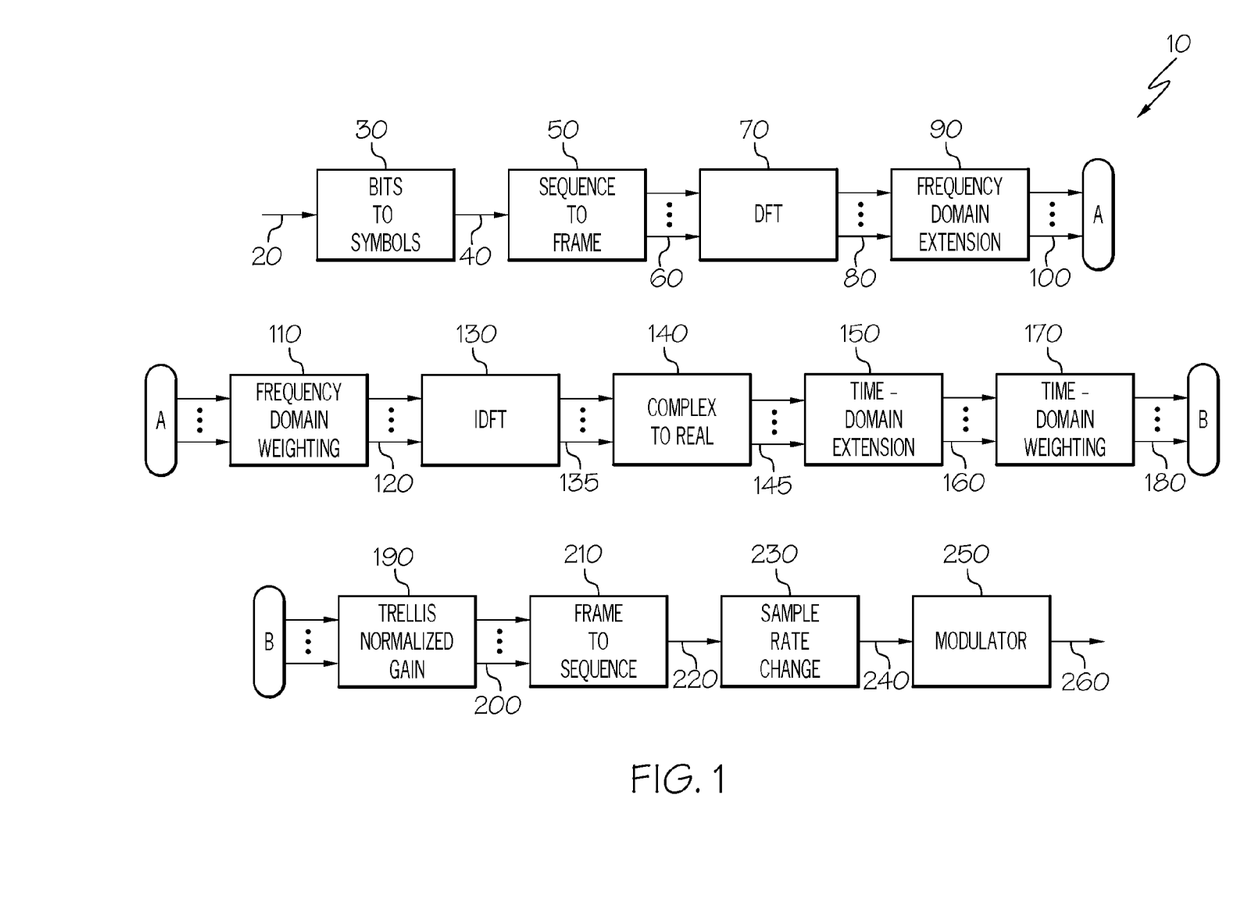
FIG. 1 depicts a system for modulating a waveform with a cyclically generated, continuous-phase, frequency-shift keying waveform according to one or more embodiments shown and described herein.

FIG. 1 depicts a waveform generator 10 for modulating the frequency of a carrier waveform with a cyclic waveform corresponding to a fixed number of symbols from a sequence of symbols. The waveform generator 10 may include a bits-to-symbols processing element 30, which may receive a sequence of binary data 20 and produce a sequence of symbols 40. The sequence of binary data 20 may include sequential binary data representing the information which is to be ultimately transmitted via the modulated waveform. The sequence of binary data 20 may consist of voice, text, video, and/or any other type of information which may be useful to transmit via a communication system. The bits-to-symbols processing element 30 may be used to convert the sequence of binary data 20 to a sequence of symbols 40 which may be binary, 3-ary, 4-ary, and so forth. The output of the bits-to-symbols processing element 30 may be a sequence of symbols 40 which corresponds to the sequence of binary data 20.

The waveform generator 10 may also include a sequence-to-frame processing element 50, which may convert the sequence of symbols 40 into one or more symbol frames 60. The sequence-to-frame processing element 50 may do this by combining a fixed number of symbols, K, into a symbol frame 60, wherein K is a positive integer. In one embodiment, K may be 64; in other embodiments, K may be 128 or 256. In general, K may be 2x, where x is a positive integer, although K may take on other integer values as well.

The waveform generator 10 may also comprise a discrete Fourier transform (DFT) processing element 70, which may convert a symbol frame 60 into a corresponding frequency-domain vector 80. If the symbol frame 60 comprises K samples, then the DFT processing element 70 may transform that symbol frame 60 into a frequency-domain vector 80 having K members. Each of the K members of the frequency-domain vector 80 may represent a frequency component of the symbol frame 60 for that particular frequency, as is known in the art.

Continuing with FIG. 1, the waveform generator 10 may also comprise a frequency-domain extension processing element 90, which may take the frequency-domain vector 80 having K members, and add one or more members to create an extended frequency-domain vector 100. Thus, the extended frequency-domain vector 100 may have L members, wherein L is greater than K.

The waveform generator 10 may further include a frequency-domain weighting processing element 110, which may weight each member of the extended frequency-domain vector 100 so as to produce a weighted extended frequency-domain vector 120 having L members. The value of each weight may be independently specified for each of the L members of the extended frequency-domain vector 100. There are multiple methods to select the weights such that, when the weighted extended frequency-domain vector 120 is transformed back into the time domain, the resulting time-domain waveform is cyclically continuous in the time domain and bandwidth limited in the frequency domain.

The waveform generator 10 may also include an inverse discrete Fourier transform (IDFT) processing element 130, which may take the L-member weighted extended frequency-domain vector 120 and transform it into the time domain by producing a complex-valued cyclic frame 135 having L samples wherein the complex-valued cyclic frame 135 is cyclically continuous in the time domain and bandwidth limited in the frequency domain.

The waveform generator 10 may also have a complex-to-real processing element 140, which may convert the complex-valued cyclic frame 135 into a real-valued cyclic frame 145 in which the samples thereof have only a real value. The real-valued cyclic frame 145 may also have L samples.

The waveform generator 10 may include a time-domain extension processing element 150, which may take the L-sample real-valued cyclic frame 145 and extend either or both ends of the real-valued cyclic frame 145 by adding one or more extended samples to produce an M-sample extended real-valued cyclic frame 160, wherein M is greater than L. In one embodiment, an equal number of extended samples are added to each end of the real-valued cyclic frame 145.

The waveform generator 10 may also have a time-domain weighting processing element 170, which may take the extended real-valued cyclic frame 160 and weight each of the L samples thereof in order to create an M-sample weighted extended real-valued cyclic frame 180.

The waveform generator 10 may further include a trellis normalizing gain processing element 190, which receives the M-sample weighted extended real-valued cyclic frame 180 and multiplies each sample by a scale factor, G, to produce a normalized cyclic frame 200 comprising M samples.

Continuing to refer to FIG. 1, the waveform generator 10 may have a frames-to-sequence processing element 210, which may convert the normalized cyclic frame 200 into a sequence of cyclic values 220. The frames-to-sequence processing element 210 may also be called a parallel-to-serial converter.

The waveform generator 10 may also have a sample rate change processing element 230, which may change the sample rate of the sequence of cyclic values 220. The sample rate change processing element 230 may increase or decrease the sample rate so as to produce a sequence of rate-adjusted cyclic values 240. Note that the sample rate change processing may preserve the normalization imposed by the trellis normalizing gain process 190.

Finally, the waveform generator 10 may include a modulator 250, which may take the sequence of rate-adjusted cyclic values 240 and modulate a carrier waveform by adjusting the frequency of the carrier waveform based on the amplitude of each sample of the sequence of rate-adjusted cyclic values 240. The modulator 250 may produce a cyclically generated, continuous-phase, frequency-shift keying (DG-CPFSK) waveform 260 which may have a substantially continuous-phase and a substantially constant amplitude.

Note that processing elements 70, 90, 110, 130, 140, and 190 may be used to create a system for converting a symbol frame 60 to a normalized cyclic frame 200. In addition, processing element 70, 90, 110, 130, 140, 190, 210, and 250 may also be used to create a system for taking a symbol frame 60 and producing a cyclically generated, continuous-phase, frequency-shift keying (CG-CPFSK) waveform 260.

Figure 2A:
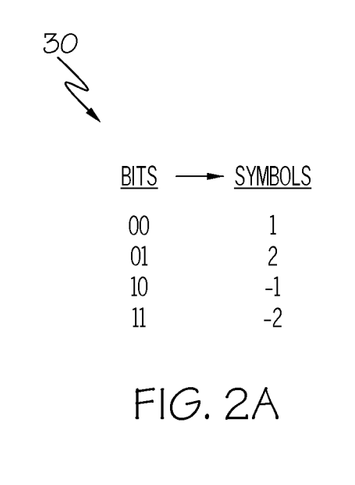
FIGS. 2A and 2B illustrate converting binary digits (bits) to symbols according to one or more embodiments shown and described herein.
Figure 2B:
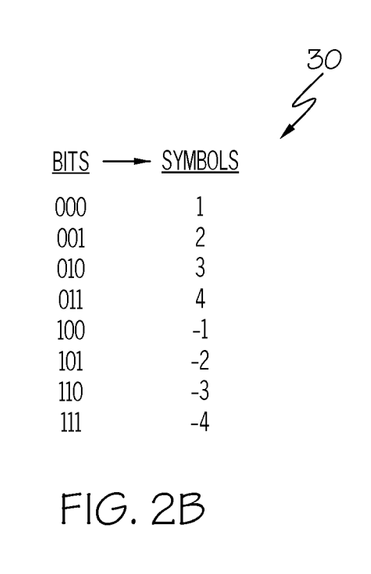

FIGS. 2A and 2B show two examples of a converting binary digits (bits) to symbols, which may be done by a bits-to-symbols processing element 30 (as shown in FIG. 1). In FIG. 2A, a 4-ary symbol mapping is shown in which two binary digits (bits) (00, 01, 10, and 11) are mapped to four unique symbols (1, 2, −1, and −2). In this example, the symbols are called 1, 2, −1, and −2, although other symbol values may be used, as is known in the art. In FIG. 2B, an 8-ary symbol mapping is shown in which three binary digits (000, 001, 010, 011, 100, 101, 110, and 111) are mapped to eight unique symbols (1, 2, 3, 4, −1, −2, −3, and −4). Other n-ary symbol mappings are contemplated, including 2-ary and 16-ary. For example, the bits-to-symbols processing element 30 of FIG. 2A would convert a sequence of 8 bits into a sequence of 4 symbols: {0, 1, 1, 0, 0, 0, 0, 1, 1, 1}→ {2, −1, 1, 2, −2}. The values of the symbols may have a corresponding meaning in the modulated output waveform. As an example, the symbols from FIG. 2A may have the following meaning: a value of 1 rotates the phase of the modulated output by π/2 radians, a value of 2 rotates the phase by π radians, a value of −1 rotates the phase by −π/2 radians, and a value of 2 rotates the phase by −π radians.

Figure 3:
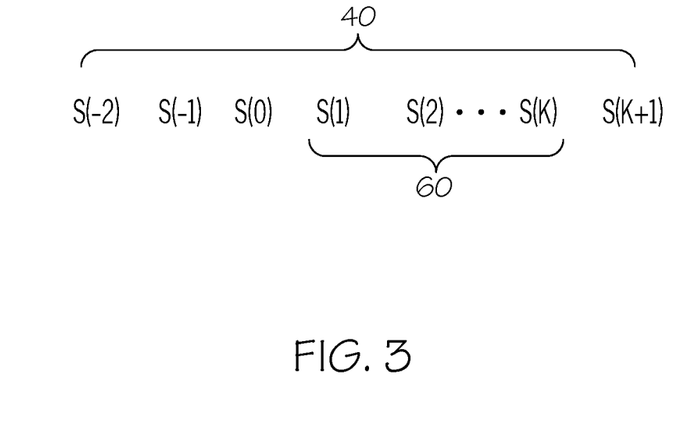
FIG. 3 shows converting a sequence of symbols into a symbol frame according to one or more embodiments shown and described herein.

FIG. 3 depicts converting a sequence of symbols 40 into a symbol frame 60, which may be performed by a sequence-to-frame processing element 50 (as shown in FIG. 1). The sequence-to-frame processing element 50 may create a symbol frame 60 having K samples by simply collecting K sequential samples from the sequence of symbols 40. After the Kth sample is collected into the symbol frame 60, the sequence-to-frame processing element 50 may then collect the next K samples (from the sequence of symbols 40) for the next symbol frame 60, and so forth. Once a particular symbol frame 60 has been created, it may be sent to the next processing element. Note that the sequence-to-symbol processing element 50 is sometimes called a serial-to-parallel converter.

Figure 4:
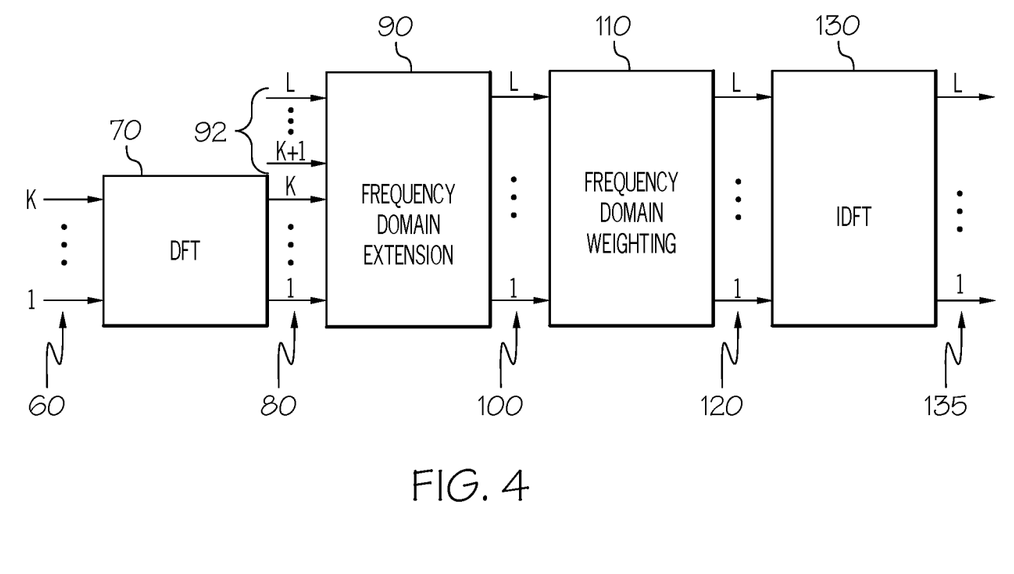
FIG. 4 depicts processing elements used to generate a cyclically continuous waveform according to one or more embodiments shown and described herein.

FIG. 4 illustrates a DFT processing element 70, a frequency-domain extension processing element 90, a frequency-domain weighting processing element 110, and an IDFT processing element 130. The DFT processing element 70 may receive a K-sample symbol frame 60 as its input. The DFT processing element 70 may convert the symbol frame 60 into its corresponding frequency-domain vector 80 by performing a discrete Fourier transform on the symbol frame 60, as is known in the art. The DFT processing element 70 may employ a fast Fourier transform (FFT) in order to implement this function. The FFT may require fewer calculations than the DFT and may lend itself to being performed by a microprocessor, digital signal processor, and the like. The DFT processing element 70 may produce a frequency-domain vector 80 having K members. Note that other suitable transforms may be applied other than the IFFT. For example, a discrete cosine or discrete sine transform may be applied.

The frequency-domain extension processing element 90 may add one or more members 92 to the frequency-domain vector 80 in order to produce an extended frequency-domain vector 100 having L members. The added frequency-domain members 92 may be selected in order to expand the discrete frequency-domain aperture for subsequent frequency-domain filtering. Note that alternative methods for frequency-domain aperture extension may also be applied.

Continuing to refer to FIG. 4, the extended frequency-domain vector 100 may be weighted by the frequency-domain weighting processing element 110 in order to adjust the original symbol frame 60 so that it is cyclically continuous in the time domain and bandwidth limited in the frequency domain. The result of this weighting is a weighted extended frequency-domain vector 120 having L members. The weighting is performed by multiplying each value in the extended frequency-domain vector 100 by the corresponding element in the frequency-domain weighting vector, thereby performing frequency-domain filtering, i.e., reducing the bandwidth, of the extended frequency-domain vector 100 while preserving detectible time-domain structure.

The weighted extended frequency-domain vector 120 may then be transformed back into the time domain by the IDFT processing element 130, which may produce a complex-valued cyclic frame 135 having L samples. The IDFT processing element 130 may employ an inverse fast Fourier transform (IFFT) in order to implement this function. The IFFT may require fewer calculations than the IDFT and may lend itself to being performed by a microprocessor, digital signal processor, and the like. Note that other suitable transforms may be applied other than the IFFT. As an example, an inverse discrete cosine or inverse discrete sine transform may also be applied.

Figure 5:
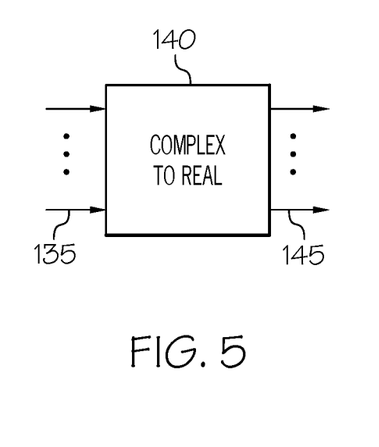
FIG. 5 shows the selection of real values from a complex-valued cyclic frame according to one or more embodiments shown and described herein.

FIG. 5 identifies a method to produce a real-valued waveform from the complex IDFT output. For each sample of the complex-valued cyclic frame 135, the complex-to-real processing element 140 outputs the real value of the sample to produce a real-valued cyclic frame 145 having L real samples.

Figure 6A:
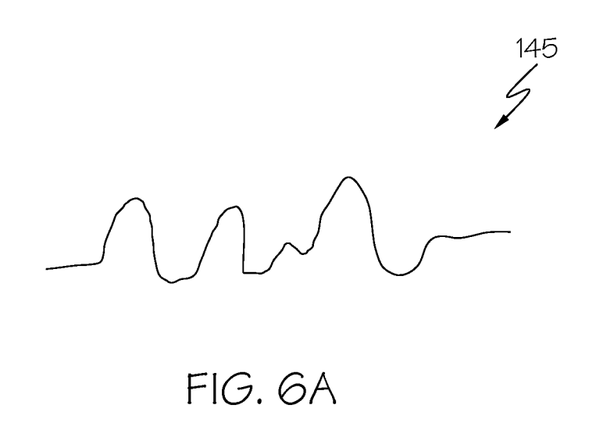
FIGS. 6A and 6B illustrate a cyclically continuous waveform according to one or more embodiments shown and described herein.
Figure 6B:
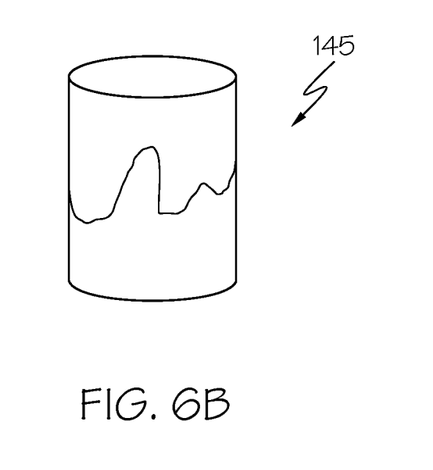

Turning now to FIGS. 6A and 6B, characteristics of the real-valued cyclic frame 145 are shown. In FIG. 6A, the L samples of the real-valued cyclic frame 145 are plotted on a time axis. The real-valued cyclic frame 145 is depicted as being cyclically continuous in the time domain and bandwidth limited in the frequency domain. For this disclosure, "cyclically continuous" is defined as follows: when the ends of the real-valued cyclic frame 145 are put together, the resulting waveform is continuous. This is shown in FIG. 6B, where the real-valued cyclic frame 145 is wrapped around a virtual cylinder so that the beginning of the real-valued cyclic frame 145 meets the end of the real-valued cyclic frame 145. Bandwidth limited means that most of the signal energy is constrained in a region of the frequency domain; for example, 95% of the energy may be contained in a bandwidth of 1 MHz. The resulting waveform wrapped around the virtual cylinder is cyclic and continuous in the time domain, and bandwidth limited in the frequency domain. All frames produced in this manner by processing elements 70, 90, 110, and 130 in FIG. 4 will have these characteristics.

Figure 7:
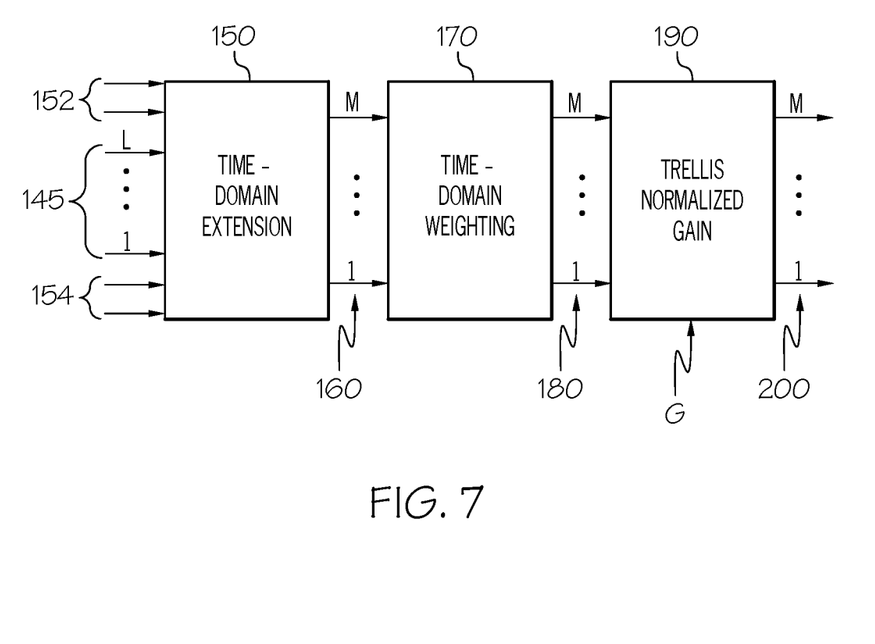
FIG. 7 shows processing elements used to perform a time-domain extension and scaling on a cyclically continuous waveform according to one or more embodiments shown and described herein.

Regarding FIG. 7, a time-domain extension processing element 150 and scaling processing element 170 are shown. The time-domain extension processing element 150 may add one or more time-domain samples 152, 154 to the real-valued cyclic frame 145, which has L samples. The resulting extended real-valued cyclic frame 160 may have M samples, where M is greater than L. As shown in FIG. 6, one or more time-domain samples 152 may be added to the end of the real-valued cyclic frame 145, and/or one or more time-domain samples 154 may be added to the beginning of the real-valued cyclic frame 145. The one or more added time-domain samples 152, 154 may be selected in order to absorb transients from adjacent frames caused by filters or reflections (i.e., multipath) experienced in the transmission channel.

The time-domain extension processing element 150 may be followed by a time-domain weighting process, which weights each sample of the extended real-valued cyclic frame 160. The weighting function may smooth discontinuities that may exist between adjacent cyclic frames. For example, if D(m) represents the 1 . . . M samples of the extended real-valued cyclic frame 160 and W(m) represents the 1 . . . M samples of the weights, then the weighting processing element 170 may set W(1) and W(M) to be zero, W(3) to W(M−2) to be one, and W(2) and W(M−1) to have transition values. In this example, the end of one frame will have value zero and the beginning of the adjacent frame will have value zero to establish a continuous transition between adjacent frames, subject to suitable bandwidth limiting. Note that all the weights W(1) to W(M) may be set to one which performs no weighting at all.

If the time-domain extension processing element 150 is not used, then the real-valued cyclic frame 145 may pass through unmodified to the time-domain processing element 170. In such a case, the input to the time-domain processing element 170 may be a real-valued cyclic frame 145 having L samples. The time-domain weighting processing element 170 produces a smoothed weighted extended real-valued cyclic frame 180.

Still referring to FIG. 7, the trellis normalizing gain element 190 may multiply each sample of the real-valued cyclic frame 160 by a scale factor, G. The value of G may be calculated based on a predetermined phase rotation value and the sum of the L samples of the real-valued cyclic frame 145 created with a single reference pulse. Note from FIG. 1 that each symbol 60 in a frame corresponds to a pulse in the real-valued cyclic frame 145. In one embodiment, it may be desired that each pulse at the real-valued cyclic frame 145, corresponding to a symbol value of +1 in one element and zeros in all other elements of the symbol frame 60, that then produces a reference pulse in the real-valued cyclic frame 145; in this example, G is set so that the sum of the reference pulse results in this reference value of $\pi/2$. Then symbol values in the symbol frame 60 of $-1$, $-2$, $2$, and $1$ will correspond to pulse sums at the real-valued cyclic frame 145 of $-\pi$, $-\pi/2$, $\pi/2$, and $\pi$ radians, respectively. Predetermined phase rotations may also be selected which are not radially symmetric around the circle. Such a scaling may permit each pulse in the real-valued cyclic frame 145 to establish a predetermined phase rotation in the subsequently-modulated waveform. The output of the trellis normalizing gain processing element 190 is a normalized cyclic frame 200.

Figure 8:
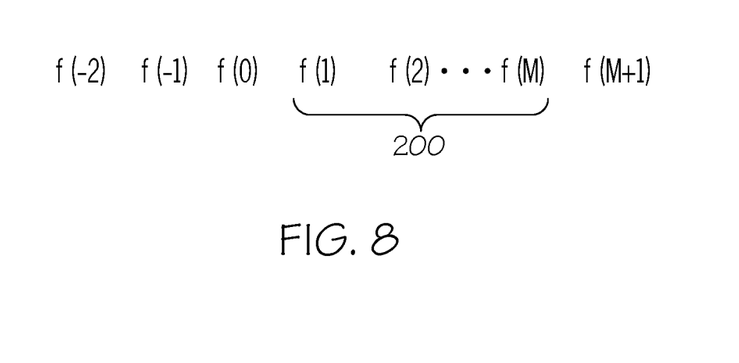
FIG. 8 depicts converting a normalized cyclic frame into a sequence of scaled cyclic values according to one or more embodiments shown and described herein.

FIG. 8 illustrates converting a normalized cyclic frame 200 into a sequence of cyclic values 220, which may be performed by a frame-to-sequence processing element 210 (as shown in FIG. 1). Note that the frame-to-sequence processing element 210 is sometimes called a parallel-to-serial converter.

Figure 9:
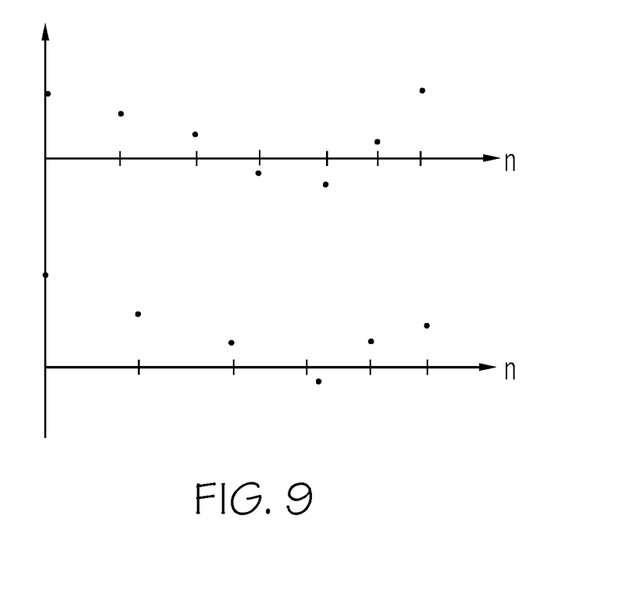
FIG. 9 illustrate changing the sample rate of a sequence of scaled cyclic values according to one or more embodiments shown and described herein.

FIG. 9 shows an example of changing the sample rate of the sequence of cyclic values 220 to another value in order to produce a sequence of rate-adjusted cyclic values 240, as may be done by the sample rate change processing element 230 (as shown in FIG. 1). In FIG. 8, the upper waveform may be the input to the sample rate change processing element 230, and the bottom waveform may be the output. In this example, four output samples are produced for every five input samples.

Figure 10A:
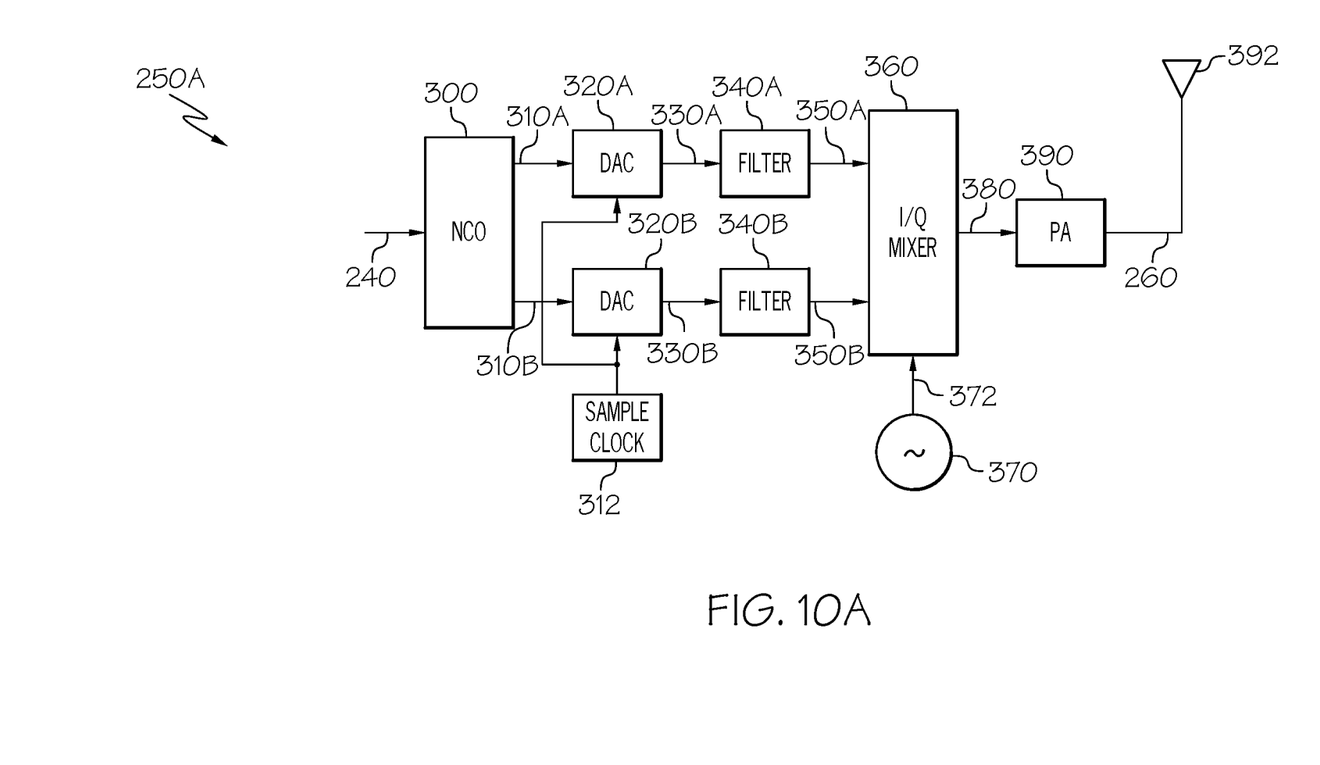
FIGS. 10A to 10C show modulating a carrier waveform with a sequence of scaled cyclic values according to one or more embodiments shown and described herein.
Figure 10B:
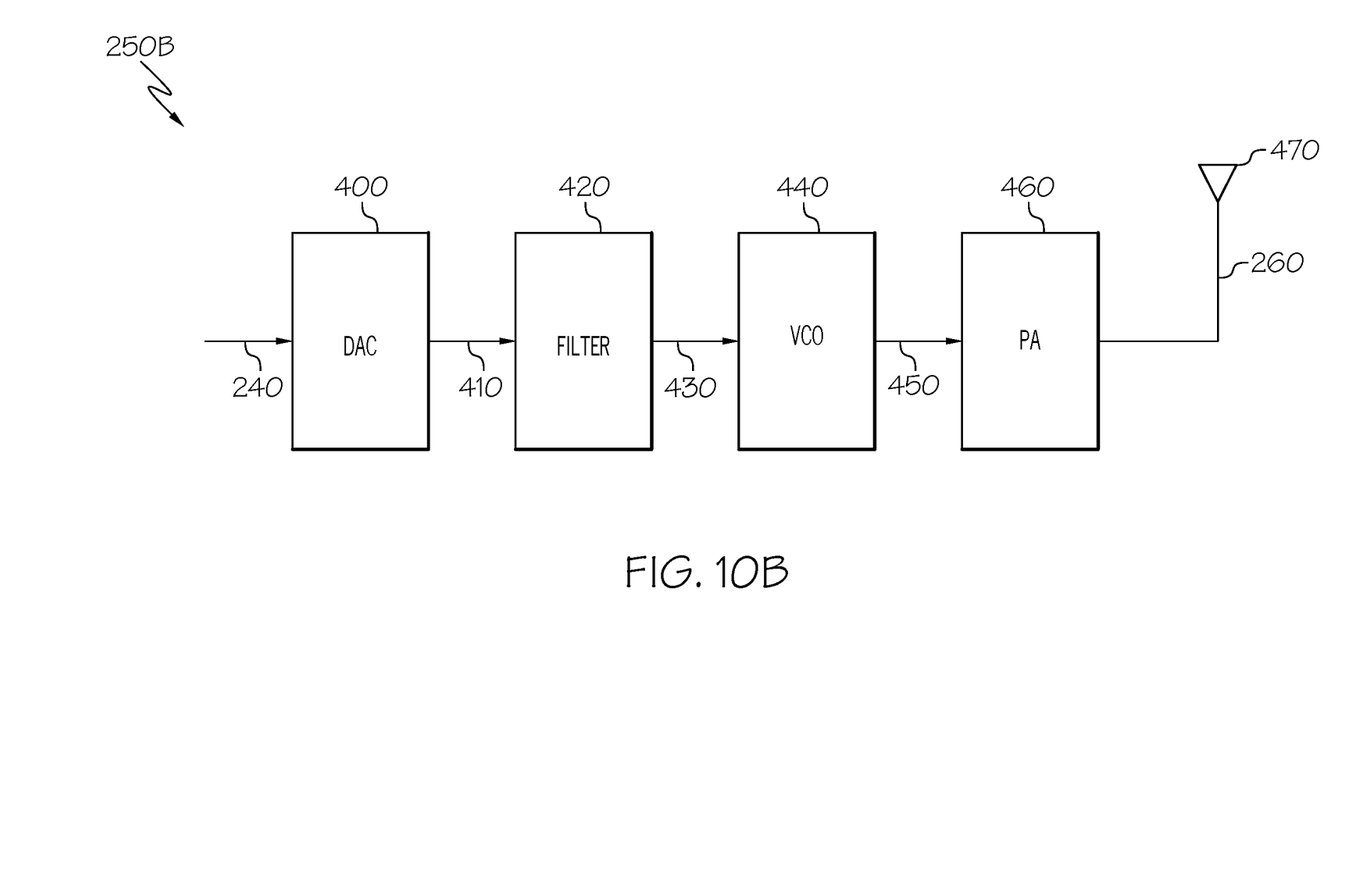
Figure 10C:
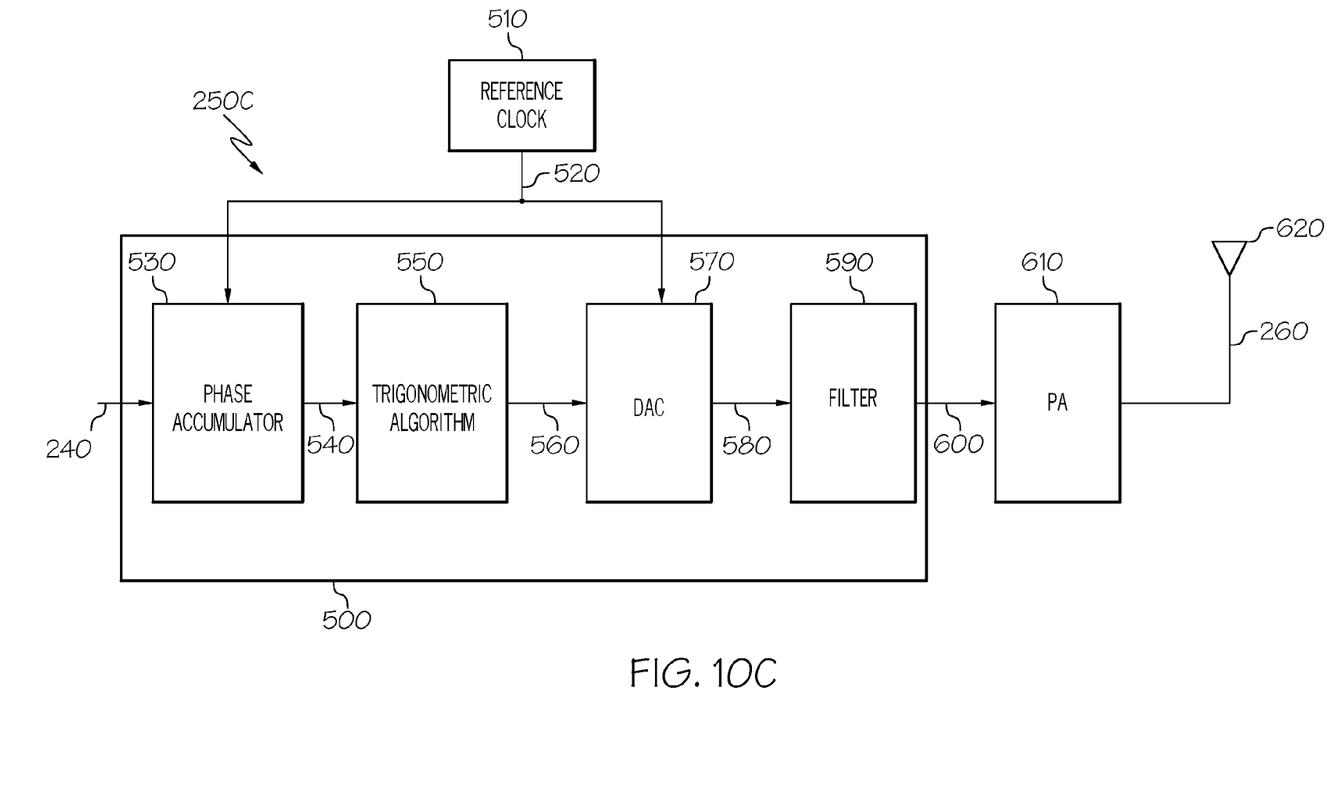

FIGS. 10A to 10C depict different embodiments of a modulator 250 (from FIG. 1). In FIG. 10A, a modulator 250A is shown which employs a numerically-controlled oscillator (NCO) 300. The input to the NCO 300 is the sequence of rate-adjusted cyclic values 240. The NCO 300 receives and integrates (sums) the sequence of rate-adjusted cyclic values 240 and produces a real portion 310A and an imaginary portion 310B of the sequence of rate-adjusted cyclic values. The real portion 310A is sometimes called the in-phase portion, and the imaginary portion 310B is sometimes called the quadrature portion. In this way, each portion 310A, 310B may be viewed as a modulated waveform that experiences a phase change of g(k) radians per sample, where g(k) is one sample from the sequence of rate-adjusted cyclic values 240. Note that the NCO 300 output may be continuous across frame boundaries. Optionally, the initial condition of the NCO 300 may be reset at the start of each frame boundary.

Each portion 310A, 310B is fed to its respective digital-to-analog converter (DAC) 320A, 320B which converts each portion 310A, 310B into a corresponding analog value 330A, 330B. Each analog value 330A, 330B is passed through its respective filter 340A, 340B which may remove any undesired high-frequency content introduced by the operation of the DACs 320A, 320B. The filtered outputs 350A, 350B are fed to an I/Q mixer 360, which uses the filtered outputs 350A, 350B to modulate an carrier waveform 372 produced by a carrier waveform generator 370. The real and imaginary portions constitute a frequency modulated signal at baseband (i.e., 0 Hz) and the I/Q mixer 360 translates the modulated spectrum to the carrier frequency established by the carrier waveform generator 370 so as to produce a modulated output 380. As such, the modulated output 380 may be a cyclically generated, continuous-phase, frequency-shift keying (CG-CPFSK) waveform. The modulated output 380 may be passed through a power amplifier 390 in order to boost the power level of the modulated output 380. This amplified modulated output 260 may be sent to an antenna 392 which may permit the amplified modulated output 260 to be wirelessly transmitted via an electromagnetic signal to a receiver. A sample clock generator 312 may produce a sample clock which synchronizes the operation of the DACs 320A, 320B.

FIG. 10B illustrates another embodiment of a modulator 250B. In this figure, the modulator 250B employs a voltage-controlled oscillator (VCO) 440. The sequence of rate-adjusted cyclic values 240 is received by the digital-to-analog converter (DAC) 400, which produces an analog output 410 based on the amplitude and phase of the sequence of the rate-adjusted cyclic values 240. The analog output 410 is fed to a filter 420, which may remove any undesired high-frequency content introduced by the operation of the DAC 400, and produces a filtered analog output 430. The filtered analog output 430 is fed to the VCO 440, which converts it to a modulated output 450 whose instantaneous frequency corresponds to the value of the filtered analog output 430. The resulting modulated output 450 may be a constant modulus waveform whose frequency is adjusted based on each sample of the sequence of rate-adjusted cyclic values 240. As such, the modulated output 450 may be a cyclically generated, continuous-phase, frequency-shift keying (CG-CPFSK) waveform. The modulated output 450 may be passed through a power amplifier 460 in order to boost the power level of the modulated output 450. This amplified modulated output 260 may be sent to an antenna 470 which may permit the amplified modulated output 260 to be wirelessly transmitted via an electromagnetic signal to a receiver.

FIG. 10C shows yet another embodiment of a modulator 250C which uses a direct digital synthesizer (DDS) 500. The sequence of rate-adjusted cyclic values 240 may be received by the phase accumulator 530, which may integrate (sum) the sequence of rate-adjusted cyclic values 240 and produces an output 540. The output 540 is fed to a trigonometric algorithm processing element 550, which converts the output 540 to a digital representation 560 of the modulated waveform on a carrier frequency. The digital representation 560 is fed to a digital-to-analog converter (DAC) 570, which produces the time-domain analog representation 580 of the modulated waveform. The analog representation 580 of the modulated waveform is passed through a filter 590, which may remove any undesired high-frequency content introduced by the operation of the DAC 570, and produces a modulated output 600. As such, the modulated output 600 may be a cyclically generated, continuous-phase, frequency-shift keying (CG-CPFSK) waveform. The modulated output 600 may be passed through a power amplifier 610 in order to boost the power level of the modulated output 600. This amplified modulated output 260 may be sent to an antenna 620 which may permit the amplified modulated output 260 to be wirelessly transmitted via an electromagnetic signal to a receiver. The modulator 250C may include a reference clock generator 520 which may produce a reference clock 520 to synchronize the operation of the phase accumulator 530 and the DAC 570.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A system for converting a symbol frame to a normalized cyclic frame, the system comprising a waveform generator having one or more processing elements arranged to:
   convert the symbol frame having K samples into a frequency-domain vector by performing a discrete Fourier transform (DFT) on the symbol frame, wherein the frequency-domain vector comprises K members, and K is a non-zero positive integer;
   create an extended frequency-domain vector having L members by adding one or more predetermined frequency-domain members to the frequency-domain vector, wherein L is greater than K, and L is a positive integer;
   weight each of the L members of the extended frequency-domain vector to produce a weighted extended frequency-domain vector such that the weighted extended frequency-domain vector is both bandwidth limited in the frequency domain and the corresponding time-domain representation of the weighted extended frequency-domain vector is cyclically continuous in the time domain;
   convert the weighted extended frequency-domain vector into a complex-valued cyclic frame by performing an inverse discrete Fourier transform (IDFT) on the weighted extended frequency-domain vector, wherein the complex-value cyclic frame comprises L samples having a complex value;
   create a real-valued cyclic frame by taking the real part of the complex-valued cyclic frame; and
   multiply each of the L samples of the real-valued cyclic frame by a scale factor, G, to produce a normalized cyclic frame comprising L samples, and the scale factor, G, is based on a predetermined phase rotation value ascribed to a modulated pulse in the real-valued cyclic frame.

2. The system of claim 1, wherein the DFT is a K-point fast Fourier transform (FFT), and the IDFT is an L-point inverse fast Fourier transform (IFFT).

3. The system of claim 1, wherein the added predetermined frequency-domain members of the extended frequency-domain vector are zero in value.

4. The system of claim 1, wherein the predetermined phase rotation value is $+\pi$, $-\pi$, $+\pi/2$, or $-\pi/2$ radians.

5. The system of claim 1, wherein the scale factor, G, is equal to the predetermined phase rotation value divided by the sum of the L samples of the real-valued cyclic frame containing a single reference pulse.

6. A system for modulating a carrier waveform with a cyclic waveform corresponding to K symbols from a sequence of symbols, the system comprising a waveform generator having one or more processing elements arranged to:
   create a symbol frame comprising K symbols from the sequence of symbols, wherein K is a non-zero positive integer;
   convert the symbol frame into a frequency-domain vector by performing a discrete Fourier transform (DFT) on the symbol frame, wherein the frequency-domain vector comprises K members;
   create an extended frequency-domain vector having L members by adding one or more predetermined frequency-domain members to the frequency-domain vector, wherein L is greater than K, and L is a positive integer;
   weight each of the L members of the extended frequency-domain vector to produce a weighted extended frequency-domain vector such that the weighted extended frequency-domain vector is both bandwidth limited in the frequency domain and the corresponding time-domain representation of the weighted extended frequency-domain vector is cyclically continuous in the time domain;
   convert the weighted extended frequency-domain vector into a complex-valued cyclic frame by performing an inverse discrete Fourier transform (IDFT) on the weighted extended frequency-domain vector, wherein the complex-valued cyclic frame comprises L samples;
   create a real-valued cyclic frame by taking the real part of the complex-valued cyclic frame;
   multiply each of the L samples of the real-valued cyclic frame by a scale factor, G, to produce a normalized cyclic frame comprising L samples, and the scale factor, G, is based on one or more predetermined phase rotation values and the sum of the L samples of the real-valued cyclic frame containing a single reference pulse; and
   modulate the carrier waveform with the L samples of the normalized cyclic frame by adjusting the frequency of the carrier waveform based on the amplitude of the L samples of the normalized cyclic frame.

7. The system of claim 6, wherein the DFT is a K-point fast Fourier transform (FFT), and the IDFT is an L-point inverse fast Fourier transform (IFFT).

8. The system of claim 6, wherein the added predetermined frequency-domain members of the extended frequency-domain vector are zero in value.

9. The system of claim 6, wherein the predetermined phase rotation value is $+\pi$, $-\pi$, $+\pi/2$, or $-\pi/2$ radians.

10. The system of claim 6, wherein the scale factor, G, is equal to the predetermined phase rotation value divided by the sum of the real portion of the L samples of the cyclic frame containing the single reference pulse.

11. The system of claim 6, wherein the processing element to modulate the carrier waveform comprises a numerically-controlled oscillator for modulating the carrier waveform.

12. The system of claim 6, wherein the processing element to modulate the carrier waveform comprises a voltage-controlled oscillator for modulating the carrier waveform.

13. The system of claim 6, wherein the processing element to modulate the carrier waveform comprises a direct digital synthesis module for modulating the carrier waveform.

14. A method for converting a symbol frame to a normalized cyclic frame, the method comprising:
converting the symbol frame having K samples into a frequency-domain vector by performing a discrete Fourier transform (DFT) on the symbol frame, wherein the frequency-domain vector comprises K members, and K is a non-zero positive integer;
creating an extended frequency-domain vector having L members by adding one or more predetermined frequency-domain members to the frequency-domain vector, wherein L is greater than K, and L is a positive integer;
weighting each of the L members of the extended frequency-domain vector to produce a weighted extended frequency-domain vector such that the weighted extended frequency-domain vector is both bandwidth limited in the frequency domain and the corresponding time-domain representation of the weighted extended frequency-domain vector is cyclically continuous in the time domain;
converting the weighted extended frequency-domain vector into a complex-valued cyclic frame by performing an inverse discrete Fourier transform (IDFT) on the weighted extended frequency-domain vector, wherein the complex-valued cyclic frame comprises L samples;
create a real-valued cyclic frame by taking the real part of the complex-valued cyclic frame; and
multiplying each of the L samples of the real-valued cyclic frame by a scale factor, G, to produce a normalized cyclic frame comprising L samples, and the scale factor, G, is based on a predetermined phase rotation value and the sum of the real portion of the L samples of the real-valued cyclic frame containing a single reference pulse.

15. The method of claim 14, wherein the DFT is a K-point fast Fourier transform (FFT), and the IDFT is an L-point inverse fast Fourier transform (IFFT).

16. The method of claim 14, wherein the added predetermined frequency-domain members of the extended frequency-domain vector are zero in value.

17. The method of claim 14, wherein the predetermined phase rotation value is $+\pi$, $-\pi$, $+\pi/2$, or $-\pi/2$ radians.

18. The method of claim 14, wherein the scale factor, G, is equal to the predetermined phase rotation value divided by the sum of the L samples of the real-valued cyclic frame containing the single reference pulse.

\* \* \* \* \*